(12) United States Patent
Crossland et al.

(10) Patent No.: US 9,678,401 B2
(45) Date of Patent: Jun. 13, 2017

(54) OPTICAL DEVICE

(75) Inventors: William Alden Crossland, Cambridge (GB); Anthony Bernard Davey, Cambridge (GB); John Richard Moore, Cambridge (GB); Daping Chu, Cambridge (GB); Jonathan Paul Hannington, Midland, MI (US); Terry Clapp, Bishop's Stortford (GB)

(73) Assignees: DOW CORNING CORPORATION, Midland, MI (US); CAMBRIDGE ENTERPRISE LIMITED, Cambridge (GB)

( * ) Notice: Subject to any disclaimer, the term of this patent is extended or adjusted under 35 U.S.C. 154(b) by 455 days.

(21) Appl. No.: 14/344,680

(22) PCT Filed: Sep. 6, 2012

(86) PCT No.: PCT/GB2012/052184
§ 371 (c)(1),
(2), (4) Date: Sep. 17, 2014

(87) PCT Pub. No.: WO2013/038148
PCT Pub. Date: Mar. 21, 2013

(65) Prior Publication Data
US 2015/0049267 A1 Feb. 19, 2015

(30) Foreign Application Priority Data
Sep. 14, 2011 (GB) .................. 1115899.5

(51) Int. Cl.
*G02F 1/137* (2006.01)
*C09K 19/02* (2006.01)
(Continued)

(52) U.S. Cl.
CPC .......... *G02F 1/13781* (2013.01); *C09K 19/02* (2013.01); *C09K 19/408* (2013.01);
(Continued)

(58) Field of Classification Search
None
See application file for complete search history.

(56) References Cited

U.S. PATENT DOCUMENTS 5,216,415 A  6/1993 Ono et al.
6,124,839 A  9/2000 Usui
(Continued)

FOREIGN PATENT DOCUMENTS

CN  101295482 A  10/2008
CN  201134234 Y  10/2008
(Continued)

OTHER PUBLICATIONS

International Search Report for Application No. PCT/GB2012/052184 dated Mar. 5, 2013, 4 pages.
(Continued)

*Primary Examiner* — Richard Kim
(74) *Attorney, Agent, or Firm* — Howard & Howard Attorneys PLLC

(57) ABSTRACT

In a method of operating a liquid crystal device having a liquid crystal composition with smectic-A properties, a first waveform is applied to optically clear the device so that it is substantially transparent to visible light and a second waveform is applied to disorder the material of the liquid crystal composition to afford a strongly light-scattering state. The first waveform has a higher frequency than the second, waveform, and the method comprises applying a modified waveform to partially clear at least a portion of the device from the light-scattering state.

11 Claims, 4 Drawing Sheets

(51) Int. Cl.
G09G 3/20 (2006.01)
G09G 3/36 (2006.01)
C09K 19/40 (2006.01)
G02F 1/133 (2006.01)
G02F 1/1337 (2006.01)

(52) U.S. Cl.
CPC .... *G02F 1/13306* (2013.01); *G02F 1/133788* (2013.01); *G09G 3/2007* (2013.01); *G09G 3/2081* (2013.01); *G09G 3/3629* (2013.01); *G09G 3/3681* (2013.01); *G09G 3/3692* (2013.01); *G09G 2300/0473* (2013.01); *G09G 2310/063* (2013.01); *G09G 2310/065* (2013.01); *G09G 2320/041* (2013.01); *G09G 2380/14* (2013.01)

(56) References Cited

U.S. PATENT DOCUMENTS

| | | | |
|---|---|---|---|
| 8,357,312 | B2 | 1/2013 | Sun |
| 8,956,548 | B2 | 2/2015 | Clapp et al. |
| 8,999,195 | B2 | 4/2015 | Chu et al. |
| 2005/0226310 | A1 | 10/2005 | Nakazawa et al. |
| 2011/0080553 | A1 | 4/2011 | Sun |

FOREIGN PATENT DOCUMENTS

| | | |
|---|---|---|
| CN | 101533162 A | 9/2009 |
| CN | 201514751 U | 6/2010 |
| CN | 101789226 A | 7/2010 |
| CN | 101789227 A | 7/2010 |
| CN | 101840085 A | 9/2010 |
| CN | 101840086 A | 9/2010 |
| CN | 101840090 A | 9/2010 |
| CN | 101840677 A | 9/2010 |
| CN | 101840681 A | 9/2010 |
| CN | 101840682 A | 9/2010 |
| CN | 101846855 A | 9/2010 |
| CN | 101866633 A | 10/2010 |
| CN | 201965373 U | 9/2011 |
| CN | 102402033 A | 4/2012 |
| CN | 102479490 A | 5/2012 |
| CN | 102622971 A | 8/2012 |
| CN | 102622972 A | 8/2012 |
| CN | 102681228 A | 9/2012 |
| CN | 102682722 A | 9/2012 |
| CN | 102830514 A | 12/2012 |
| CN | 102831865 A | 12/2012 |
| EP | 2 256 545 A1 | 12/2010 |
| GB | 2 274 649 A | 8/1994 |
| WO | WO 98/39794 A2 | 9/1998 |
| WO | WO 2004/022670 A1 | 3/2004 |
| WO | WO 2009/111919 A1 | 9/2009 |
| WO | WO 2011/115611 A1 | 9/2011 |
| WO | WO 2013/038152 A1 | 3/2013 |

OTHER PUBLICATIONS

English language abstract and machine-assisted English translation for CN 201134234 provided by Murgitroyd & Company on Apr. 25, 2014, 16 pages.
English language abstract for CN 101295482 extracted from espacenet.com database on Jun. 30, 2014, 1 page.
English language abstract for CN 201514751 extracted from espacenet.com database on Jun. 30, 2014, 1 page.
English language abstract for CN 101789226 extracted from espacenet.com database on Jun. 30, 2014, 1 page.
English language abstract for CN 101789227 extracted from espacenet.com database on Jun. 30, 2014, 1 page.
English language abstract and machine-assisted English translation for CN 102622971 provided by Murgitroyd & Company on Apr. 25, 2014, 15 pages.
English language abstract and machine-assisted English translation for CN 101840085 provided by Murgitroyd & Company on Apr. 25, 2014, 26 pages.
English language abstract for CN 101840086 extracted from espacenet.com database on Jun. 30, 2014, 1 page.
English language abstract and machine-assisted English translation for CN 101840090 provided by Murgitroyd & Company on Apr. 25, 2014, 20 pages.
English language abstract for CN 101840677 extracted from espacenet.com database on Jun. 30, 2014, 1 page.
English language abstract and machine-assisted English translation for CN 101840681 provided by Murgitroyd & Company on Apr. 25, 2014, 29 pages.
English language abstract for CN 101840682 extracted from espacenet.com database on Jun. 30, 2014, 1 page.
English language abstract for CN 101846855 extracted from espacenet.com database on Jun. 30, 2014, 1 page.
English language abstract and machine-assisted English translation for CN 101866633 provided by Murgitroyd & Company on Apr. 25, 2014, 23 pages.
English language abstract for CN 201965373 extracted from espacenet.com database on Jun. 30, 2014, 1 page.
English language abstract for CN 102402033 extracted from espacenet.com database on Jun. 30, 2014, 1 page.
English language abstract for CN 102479490 extracted from espacenet.com database on Jun. 30, 2014, 1 page.
English language abstract and machine-assisted English translation for CN 102622972 provided by Murgitroyd & Company on Apr. 25, 2014, 18 pages.
English language abstract for CN 102681228 extracted from espacenet.com database on Jun. 30, 2014, 1 page.
English language abstract and machine-assisted English translation for CN 102682722 provided by Murgitroyd & Company on Apr. 25, 2014, 17 pages.
English language abstract for CN 102830514 extracted from espacenet.com database on Jun. 30, 2014, 1 page.
English language abstract and machine-assisted English translation for CN 102831865 provided by Murgitroyd & Company on Apr. 25, 2014, 14 pages.
International Search Report for Application No. PCT/GB2012/052188 dated Nov. 29, 2012, 4 pages.
English language abstract for CN 101533162 extracted from espacenet.com database on Jun. 25, 2014, 1 page.
English language abstract for WO 2009/111919 extracted from espacenet.com database on Jun. 25, 2014, 1 page.
Aristov et al. "Features of the Control of Array-Type Liquid-Crystal Memory Displays", Journal of Optical Technology, vol. 68, No. 9, Sep. 30, 2001, pp. 660-664.
Crossland et al. "An Electrically Addressed Smectic Storage Device", SID Digest of Technical Papers, Apr. 30, 1985, pp. 124-127.
Fagerberg et al., "Electrically Addressed Smectic a Liquid Crystal Displays and Their Liquid Crystal Microstructure", SID International Symposium, Anaheim, CA., May 17-22, 1998, The Whole Document (4 pages).
Mitrokhin et al., "62.3: Reflective Bistable Smectic-A Passive Matrix LCDs", SID International Symposium, Boston, MA., May 24-27, 2005, vol. XXXVI, pp. 1774-1777.

OPTICAL DEVICE

RELATED APPLICATIONS

This application is the National Stage of International Patent Application No. PCT/GB2012/052184, filed on Sep. 6, 2012, which claims priority to and all the advantages of Great Britain Patent Application No. GB 1115899.5, filed on Sep. 14, 2011, the content of which is incorporated herein by reference.

The present invention is in the field of photonics. Embodiments relate to an optical device using a liquid crystal material having Smectic-A properties, for example a display, a panel for affecting the transmission of light or an amplitude spatial light modulator. Embodiments relate to a method of operating such an optical device.

An embodiment relates to optical devices in which a disordered state is produced by the process of SmA dynamic scattering and a clear, uniform state is induced by dielectric re-orientation. Such optical devices can be used to provide variable amounts of light transmission—either locally, for example in "pixels" or across the whole device without the need for optical polarisers.

Liquid crystals have molecules which tend to self order without freezing and thus gain crystalline attributes even though they still flow and may fill a container. The phases of liquid crystals are broadly a generalised sequence of states that such a molecular fluid may pass through on the way from being an isotropic liquid until it freezes as a solid. In general such molecules will be typified by strong anisotropy. The form that this anisotropy takes can be considered where the molecule is typified by a high aspect ratio (much longer than wide, thus "rod" or "lath" like), and may have dipole character, and anisotropic polarisability. In these cases the average direction of molecular orientation is referred to as the "director".

Nematic liquid crystals typify the commonest liquid crystalline materials and are commonly used in liquid crystal flat screen devices and flat-panel displays. Extending the length of nematic mesogens, or other structural changes, very often causes them to show further phases upon cooling below the nematic phase, and before solidification, and at lower temperatures the typical character may be of a "layered fluid". Such layered liquid crystals are called "smectic" liquid crystals. Herein we will only consider the materials normally referred to as "smectic A", abbreviated to "SmA", liquid crystals. For example the proto-typical "5CB" (4'-pentyl-4-biphenylcarbonitrile), "5OCB" (is the ether linked pentyl, 4'-(pentyloxy)-4-biphenylcarbonitrile), is nematic, the "8CB" (4'-octyl-4-biphenylcarbonitrile) and "8OCB" (4'-(octyloxy)-4-biphenylcarbonitrile), each exhibit a SmA phase beneath the higher temperature nematic phase, where in the abbreviation "mCB" and "mOCB":—m stands for an integer and refers to the number of carbon atoms in the alkyl or alkoxyl chain in 4-cyano-4'-n-alkylbiphenyl and 4-cyano-4'-n-alkoxybiphenyl, respectively; for example:

8CB=4-cyano-4'-octylbiphenyl; and
8OCB=4-cyano-4'-octyloxybiphenyl

The molecules forming SmA phases have similar properties to those forming nematic phases. They are rod-like and usually have a positive dielectric anisotropy. The introduction of a strong transverse dipole in order to induce a negative dielectric anisotropy tends to destabilise the SmA phase and may lead to increased chemical instability.

Smectic liquid crystals exhibit hysteresis in their switching so that dielectric re-orientation (or other disturbances of the smectic structure) does not relax when an applied electric field is removed. Unlike most nematic liquid crystal structures, dielectrically re-oriented SmA liquid crystals rest in the driven state until further forces are applied.

A panel may be formed by taking planar sheets, for example of glass, and applying to these a transparent conducting layer, typically made of indium tin oxide, the conducting layers being connected to conductors so that a variable field may be applied. These two sheets may be formed into a panel for example separated by beads of uniform diameter (typically, say, 5-15 micrometers, dependent on desired cell thickness). This panel is then edge sealed with glue allowing one or more apertures for filling with the liquid crystal material.

Using such a cell a SmA liquid crystal layer may be formed by filling the panel (typically at an elevated temperature above the isotropic transition for the material). In the SmA devices discussed here, no alignment layers are required unlike nematic devices where uniform alignment of the cell is essential. On filling and thermally cycling such a SmA panel from room temperature to above the isotropic transition and back again, the liquid crystal will exhibit textures that are typical for the phases. Whilst the nematic, with no surface alignment, may appear in the well-known Schlieren texture where line defects or 'threads' scatter light, in the SmA a 'focal conic' texture is formed as a consequence of the layered structure of the SmA material. There is a sharp spatial variation in the refractive index which results in light scattering. The appearance of these textures results from the anisotropy of the refractive index, which is highest when light is travelling orthogonal to the more polarisable axis of the average molecular direction. The variation in refractive index causes light scattering. When viewed (under a microscope) between crossed polarisers, contrast can also be observed between regions of different molecular orientations.

To electrically address a SmA liquid crystal panel an alternating (AC) field is normally applied. In non-doped materials, positive dielectric anisotropy of the LC will cause the re-arrangement of initially randomly aligned poly-domains, to align the mesogen with the field direction (normal to the glass surface). The panel will appear clear, as the average orientation of the anisotropic molecules is normal to the glass layer. For most non-doped SmA materials this situation is only reversible by heating the cell to destroy the SmA alignment.

If a suitable ionic dopant is dissolved in the SmA liquid crystal host, then under the influence of DC or low frequency (e.g. <200 Hz) electric fields, two orthogonal forces attempt to orient the smectic A director:—
i) Dielectric re-orientation as described above attempts to align the SmA director (indicating the average direction of the long molecular axis) in the field direction.
ii) Simultaneously, the movement of ions through the SmA electrolyte attempts to align the smectic A director in the direction in which ions find it easier to travel.

In SmA materials this is within the layers i.e. orthogonal to the field direction (i.e. the materials have positive dielectric anisotropy and negative conductivity anisotropy). The two competing forces give rise to an electro-hydrodynamic instability in the liquid crystal fluid that is referred to as 'dynamic scattering'. In smectic-A materials the dynamic scattering state strongly scatters light and (in contrast to the similar state in nematic materials) the disruption of the SmA structure that it produces remains after the electrical pulse causing it has terminated. The reversibility between the clear, uniformly oriented, state and the ion-transit induced, poly-domain, scattering state, depends upon the different frequency domains in which these processes operate. Dynamic scattering requires the field driven passage of ions through the liquid crystal fluid. It therefore occurs only with DC or low frequency AC drive.

Higher frequencies cause dielectric re-orientation (the ions cannot "move" at these frequencies) thus re-establishing a uniform orientation of the molecules.

Thus the combination of dielectric re-orientation (into a clear transparent state) and dynamic scattering (into a strongly light scattering state) in a suitably doped SmA phase (possessing positive dielectric anisotropy and negative conductivity anisotropy) can form the basis of an electrically addressed display. High frequencies (variable, typically ≥1000 Hz) drive the SmA layer into an optically clear state and low frequencies (variable, typically <200 Hz) drive it into the light scattering state. A key feature of such a display is that both these optical states are set up using short electrical addressing periods, and both persist indefinitely, or until they are re-addressed electrically. This is not true of the related phenomena in nematic liquid crystals. It is this property of electro-optic bistability (or more accurately multi-stability) that allows SmA dynamic scattering displays to be matrix addressed without pixel circuitry and which results in their extremely low power consumption in page-oriented displays or in smart windows.

There is a need with optical devices using SmA compositions to provide transmission properties intermediate the "fully scattered" and the "fully cleared" states.

In one aspect there is disclosed a method of operating a liquid crystal device having a smectic-A liquid crystal composition, in which a first waveform is applied to optically clear the device so that it is substantially transparent to visible light and a second waveform is applied to disorder the material of the liquid crystal composition to afford a strongly light-scattering state, wherein the first waveform has a higher frequency than the second waveform, the method comprising applying a modified waveform to partially clear at least a portion of the device from the light-scattering state.

The first waveform may be a repetitive dc balanced waveform consisting of a quasi-continuous series of cycles, the number of cycles being at least equal to a predetermined number, wherein the predetermined number clears the device, and the step of applying a modified waveform may comprise applying a number of cycles of the first waveform fewer than the predetermined number.

The method may comprise determining a number of cycles of the first waveform sufficient to clear the device, and applying a fewer number of cycles, as said modified waveform, to partially clear the device.

The first waveform may be dc balanced and have constant amplitude.

The step of applying a modified waveform may comprise applying one or more cycles of a waveform having the frequency of the first wave form and an amplitude less than the amplitude of the first waveform.

The method may comprise varying the amplitude of the modified waveform.

The first waveform may have a predetermined pulse width, and the step of applying a modified waveform may comprise at least one cycle having the frequency of the first waveform and having a pulse width different to the predetermined pulse width.

In another aspect a liquid crystal device has a smectic-A liquid crystal composition, wherein which a first waveform is applied to optically clear the device so that it is substantially transparent to visible light and a second waveform is applied to disorder the material of the liquid crystal composition to afford a strongly light-scattering state, wherein the first waveform has a higher frequency than the second waveform, the device further comprising a control circuit for applying a modified waveform to partially clear at least one portion of the device from the light-scattering state In the device, the control circuit is configured to respond to a control input for selecting a desired degree of clearing of the at least one portion of the device.

The control circuit may be configured to take into account the temperature of the liquid crystal composition.

The smectic A liquid crystal composition may be a composition as described in PCT/US10/27328, claiming priority from U.S. patent application 61/314,039, incorporated herein by reference The liquid crystal composition may comprise, in weight %:

(a) 25-75% in total of at least one siloxane of the general formula I:

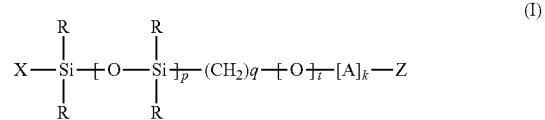

wherein p=1 to 10, e.g. 1 to 3, q=1 to 12, e.g. 6 to 10, t=0 or 1, k=2 or 3,

A is a phenyl or cyclohexyl ring which may be the same or different and are bonded together in para positions, R=a $C_{1-3}$ alkyl group, e.g. methyl, which may be the same or different, X=a $C_{1-12}$ alkyl group, and Z=F, Cl, Br, I, CN, $NH_2$, $NO_2$, $NMe_2$, NCS, $CH_3$, or $OCH_3$, $CF_3$, $OCF_3$, $CH_2F$, $CHF_2$ especially CN;

(b) 0.001-1% in total of at least one quaternary ammonium salt of the general formula II:

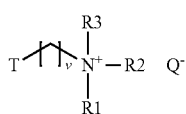
(II)

wherein:
T=a methyl group or a silyl or siloxane group and
v=1 to 30, for example v=9 to 19, e.g. myristyl (v=13, T=methyl) or cetyl (v=15 and T=methyl),
R1, R2 and R3, which may be the same or different, are $C_{1-4}$ alkyl, e.g. methyl or ethyl,
$Q^-$ is an oxidatively stable ion, especially a $ClO_4^-$ ion, (c) 20-65% in total of at least one polarisable linear molecule having an alkyl chain, the molecule having the general formula III:

 (III)

wherein:
D stands for a $C_{1-16}$ straight chained alkyl or alkoxy group optionally containing one or more double bonds;
k=2 or 3,
A' is a phenyl, cyclohexyl, pyrimidine, 1,3-dioxane, or 1,4-bicyclo[2,2,2]octyl ring, wherein each A may be the same or different and are bonded together in para positions, the terminal ring attached to Y optionally being a phenyl and
Y is located in the para position of the terminal ring of the group $A'_k$ and is selected from Z (as defined above in connection with Formula I), $C_{1-16}$ straight chained alkyl, $C_{1-16}$ straight chained alkoxy, $OCHF_2$, $NMe_2$, $CH_3$, $OCOCH_3$, and $COCH_3$; and (d) 2-20%, optionally 5-15, in total of at least one side chain liquid crystal polysiloxane of the general formula IV:

(IV)

wherein:
a, b and c each independently have a value of 0 to 100 and are such that a+b+c has an average value in the range 3 to 200, e.g. 5 to 20; and a is such that the chain units of the formula $Y—R_2SiO—[SiR_2—O]_a$ represents 0 to 25 mole percentage of the compound of the general formula IV, and c is such that the units of the formula chain $—[SiHR—O]_c—R_2SiO—Y$ represents 0 to 15 mole percentage of the compound of the general formula IV,
m=3 to 20, e.g. 4 to 12;
t=0 or 1,
k=2 or 3
A is a phenyl or cyclohexyl ring which may be the same or different and the rings are bonded together in para positions,
R=a $C_{1-3}$ alkyl group, e.g. methyl, each of which may be the same or different, and
Y=a $C_{1-12}$ alkyl group, a chromophore or a calamitic liquid crystal group and each of which may be the same or different, and
Z is as defined above in connection with Formula I.
and wherein the amounts and nature of the components are selected such that the composition possesses smectic A layering, as detected by X-ray diffraction.

Such a composition has a relatively high and well-defined switching threshold. In other words the voltage gradient between electrodes of a cell containing the composition must reach a well-defined level before the composition is affected.

The siloxane oligomeric moiety (a) may be a compound of the formula Ia:

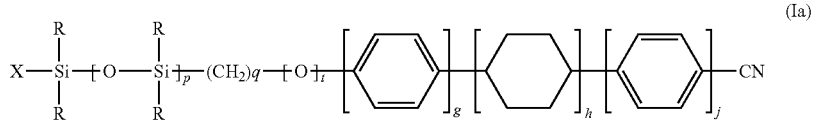
(Ia)

where X, R, p, q and t are defined above in connection with Formula I and g and h each independently stand for 0, 1 or 2 and j stands for 1, 2 or 3, subject to the requirement that g+h+j is 2 or 3.

The side chain siloxane liquid crystal, component (d), which may be a polymer, copolymer or terpolymer, may be a compound of the general formula IVa

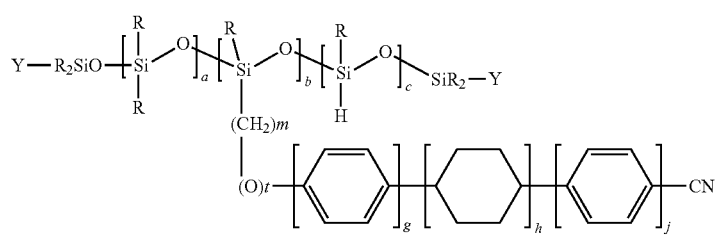
(IVa)

where a, b, c, m and t are as defined in connection with Formula IV, g=0, 1 or 2, h=0, 1 or 2, j=1, 2, or 3, subject to the requirement that g+h+j is 2 or 3; each R may be the same or different and is an alkyl group, e.g. methyl; and Y=a $C_{1-8}$ alkyl group, a chromophore or a calamitic liquid crystal group.

The ionic anion (b) of formula II may be a compound of the formula (IIa):

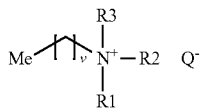

where v, R1, R2, R3 and Q are as defined in claim 1 in connection with Formula II.

The ionic anion of formula II may be a compound of the formula IIb:

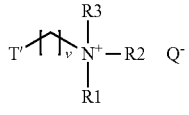

wherein v, R1, R2, R3 and Q are as defined in claim 1 or claim 4 in connection with Formula II and T' is a silyl or siloxane group.

Component (c) may comprise an organic calamitic mesogen which exhibits either a nematic or a Smectic A liquid crystal phase.

The at least one polarisable linear molecule, component (c), may include a compound of the formula IIIa and/or a compound of the formula IIIb.

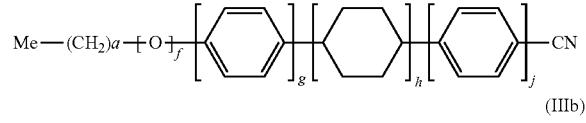

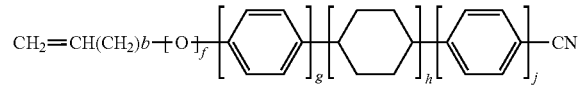

where a=1 to 15 and b=1 to 13; f=0 or 1, j=1, 2 or 3; g=0, 1, or 2, h=0, 1, or 2, subject to the requirement that g+h+j does not exceed 3.

The composition may further include:
(e) up to 10% by weight in total of at least one positive or negative dichroic dye, optionally a cyan, yellow, magenta, red, green or blue dye or an emissive dye, e.g. a fluorescent or phosphorescent dye, the dye being aligned with neighbouring mesogenic components of the composition.

The composition may include:
(f) up to 10% of one or more viscosity-reducing solvents or diluents.

The compositions may further include:
(g) up to 10 wt % of at least one molecule e.g. a lath-shaped molecule, that is not a liquid crystal, but which can be incorporated into the formulation, without degrading the smectic A layer quality of the composition.

The at least one molecule that is not a liquid crystal may comprise a compound of the formula (V):

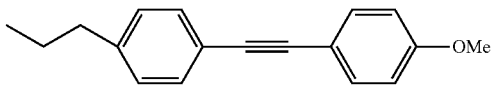

The composition may also include:
(h) up to 50% by weight, e.g. up to 40%, in total of at least one birefringence-altering additive, e.g. birefringence increasing additives, for example:

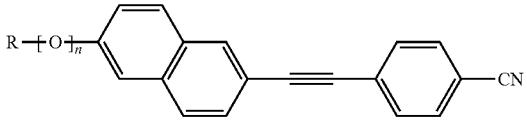

where R=$C_{1-10}$ alkyl, n=0 or 1,

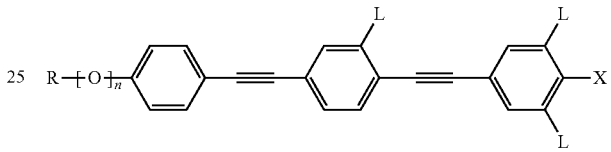

where R=$C_{1-10}$ alkyl, n=0 or 1, L is selected from hydrogen, or $C_{1-3}$ alkyl and X=CN, F, NCS, $CF_3$, $OCF_3$ or $C_{1-6}$ alkyl or

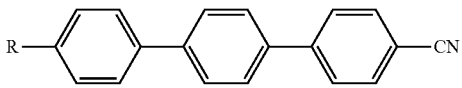

where R is a $C_{1-10}$ alkyl group.
or birefringence-lowering additives, for example:

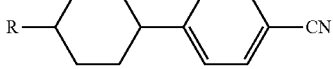

where R=a $C_{1-10}$ alkyl group.
or

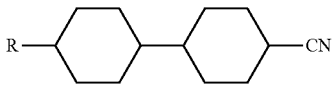

where R=a $C_{1-10}$ alkyl group

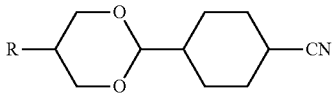

where R=a $C_{1-10}$ alkyl group

The total amount of the birefringence-altering additive component (h) and the total amount of component (c) may be in the range of 35-73 wt %. e.g. 40-65 wt % or 45-60 wt %.

The composition may have a birefringence in the range 0.15 to 0.3, and preferably 0.16 to 0.2, at 20° C. and 589 nm and be opaque in the disordered state and clear in the ordered state.

The composition may include up to 10% by weight in total of at least one positive or negative dichroic dye, optionally a cyan, yellow, magenta, red, green or blue or a black dye, or an emissive dye, e.g. a fluorescent or phosphorescent dye, the dye being aligned with neighbouring mesogenic components of the composition.

The composition may have a birefringence in the range 0.07 to 0.15, and preferably 0.1 to 0.13, at 20° C. and 589 nm, (ii) is translucent in the disordered state and clear in the ordered state and (iii) includes up to 10% by weight in total of at least one positive or negative dichroic dye, optionally a cyan, yellow, magenta, red, green or blue dye, or a black dye or an emissive dye, e.g. a fluorescent or phosphorescent dye, the dye being aligned with neighbouring mesogenic components of the composition.

In the drawings.

Like reference signs refer to like parts.

Figure 1:
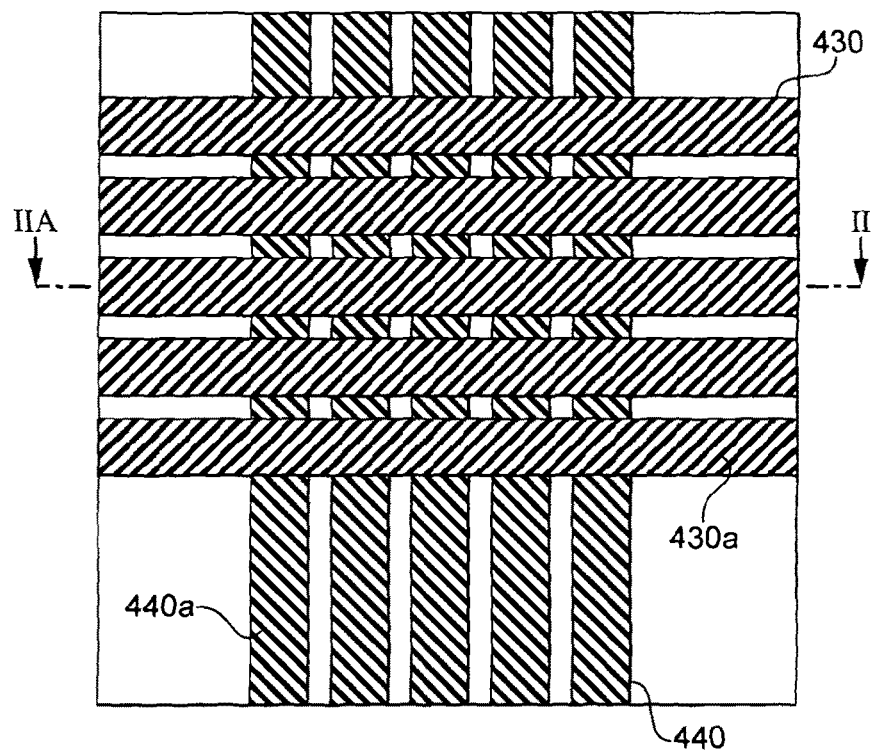
FIG. 1 is a plan view of a first example of a liquid crystal panel.
Figure 2:
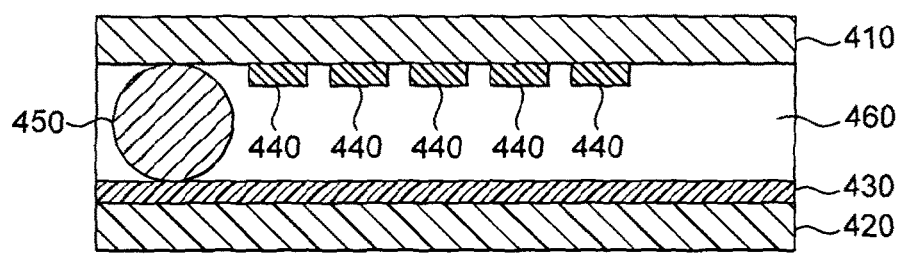
FIG. 2 is a cross-section along the line II-IIA of FIG. 1.

Referring to FIGS. 1 and 2, a display panel 400 has first and second substrates 410,420. In this embodiment both of the substrates are transparent to visible light and are of glass, thus being generally rigid. In other embodiments, transparency and rigidity may not be required, and some embodiments use substrates of relatively flexible material, for example a polymer such as PET.

In this embodiment the panel is dimensioned such that a total voltage across a pixel of 100 volts is insufficient to affect the liquid crystal material (eg to cause a state change). The thickness of the liquid crystal material is typically in the range of 2-50 microns, e.g. 5-15 microns.

The panel 400 has a first set of electrodes 430 shown in FIG. 1 as extending laterally across the device 400, and these are referred to for convenience herein as row electrodes. The panel 400 has a second set of electrodes 440 extending perpendicular to the row electrodes 430, and these are referred to for convenience herein as row electrodes. It will be understood of course that the device 400 need not be oriented as shown. The electrodes 430, 440 in this embodiment are transparent to visible light Examples of suitable materials are gold or ITO.

The column electrodes 440 are disposed on the inner surface of the first substrate 410, and the row electrodes on the inner surface of the second substrate 420. The substrates are maintained in spaced relationship by spacers 450, shown here as spheres. The spacing between the substrates forms a chamber which contains a smectic A composition 460 As previous discussed, the liquid crystal composition is a thermotropic liquid crystal smectic A composition exhibiting a smectic type A phase made up of multiple layers, wherein under the influence of different electric fields applied between the electrodes, the alignment of the layers of the composition can become more ordered or more disordered, the composition has stable states in which the alignment of the layers of the composition are differently ordered including an ordered state, a disordered state and intermediate states, the composition being such that, once switched to a given state by an electric field, it remains substantially in that state when the field is removed.

No alignment layer is provided in this embodiment. In other embodiments, alignment layers may be used.

In use, voltages applied between row electrodes and column electrodes influence the liquid crystal composition between the relevant electrodes. For example, referring again to FIG. 1, it will be seen that an exemplary row electrode is marked 430*a* and an exemplary column electrode is marked 440*a*. If a low frequency voltage, less than 500 Hz,—e.g. 50 Hz, 60 Hz,—the voltage being of suitable amplitude for the thickness of liquid crystal composition (for example 150 volts), the material of the composition directly associated with the electrode crossover will become scattered and will block transmission of visible light. If a relatively high frequency, over 1000 Hz—e.g. 2 KHz— voltage is applied, this will clear the composition at that location and light will be transmitted through the composition at that location.

Figure 3:
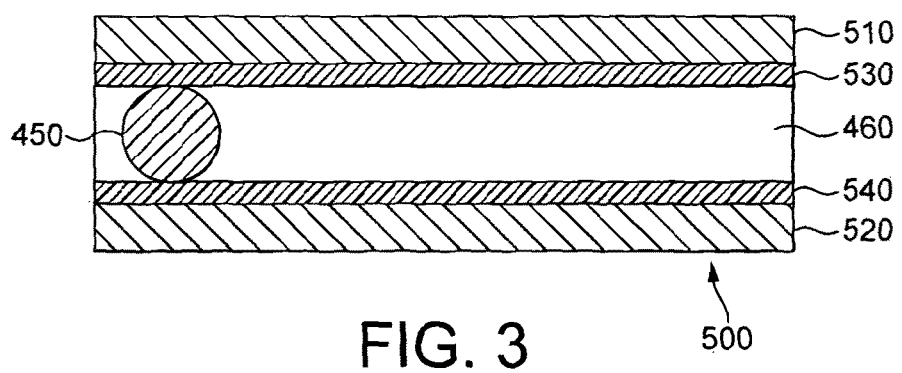
FIG. 3 is a cross-section similar to that of FIG. 2, through a second example of a liquid crystal panel.

Referring to FIG. 3, a panel 500 is shown. This panel is generally similar to the one shown in FIGS. 1 and 2, except that the electrodes 530, 540 are generally continuous across the whole or a major part of the substrates 510, 520. In this embodiment the substrates 510,520 are transparent to visible light but are of polymer material.

Figure 4:
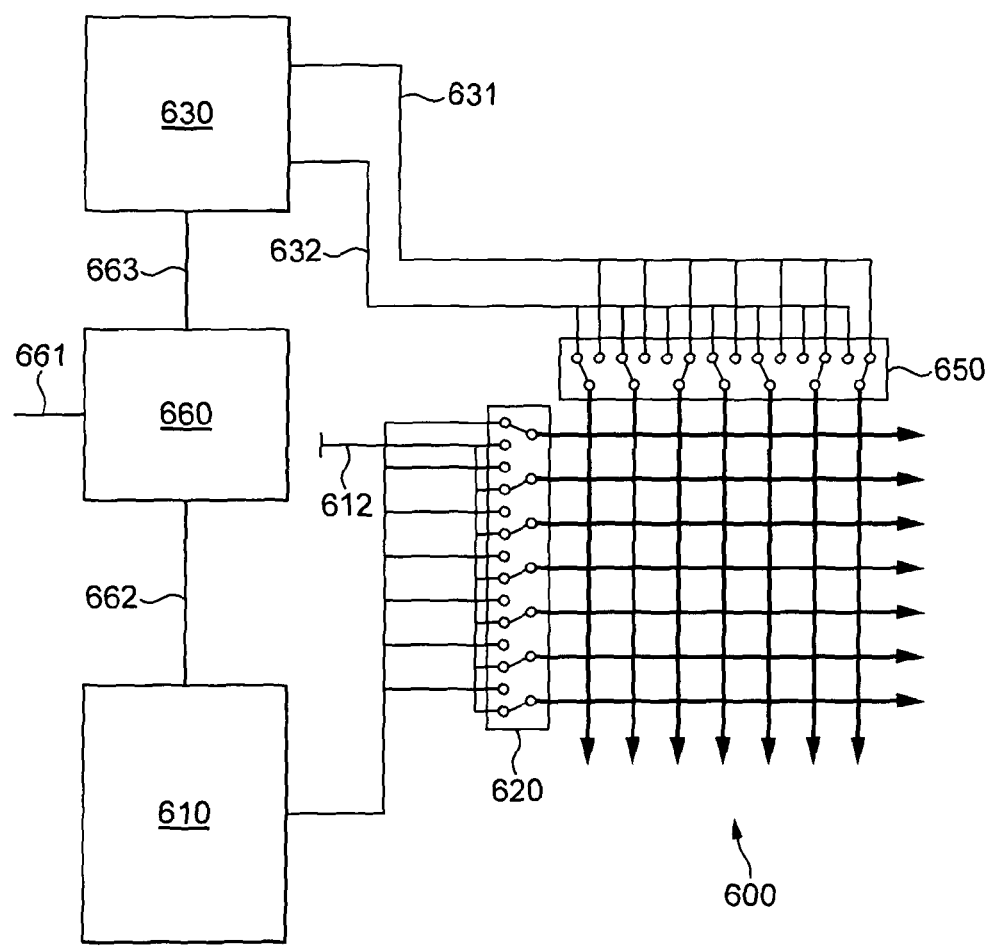
FIG. 4 shows a schematic diagram of a drive arrangement for a liquid crystal panel.

Referring to FIG. 4 an illustrative drive arrangement 600 has a first waveform generator 610 that, in this arrangement, generates rectangular pulses of defined "clearing" frequency—say 2 KHz, and that is connected to the row electrodes 430 of the panel via a first switch 620 that consists of a number of changeover switches, one per row electrode, with the switch wipers being connected to the row electrodes, one switch terminal being connected to the first waveform generator output 611 and the other switch terminal being connected to ground 612. The first switch 620 is controlled so that one only of the row electrodes is connected to the first waveform generator 610 at a time.

A second waveform generator 630 generates complementary outputs 631, 632 that are synchronous with the output of the first waveform generator 610. The first output 631 is in phase with the output of the first waveform generator 610, and the second output 632 is in antiphase with the output of the first waveform generator 610. A second switch 650 is generally similar to the first 620, but the two poles of each switch are coupled to the in-phase and anti-phase outputs respectively of the second waveform generator 630.

In this arrangement, first the whole panel is set to the scattered state by applying mains frequency across all of the pixels using circuitry not shown.

Then, to clear pixels in a specified row on the panel 400, the first switching arrangement 620 is operated to select the relevant row in which the pixels are connected. All other rows remain grounded. The second switching arrangement 650 is controlled so as to select pixels to be cleared by connecting them to the antiphase output 632. Those to be left unchanged (i.e. those that are to remain scattered) are connected to the in-phase output 631.

Pixels lying in columns connected to the antiphase output 632 and lying on the selected row are then subject to a high enough voltage at the clearing frequency to cause them to clear. The voltage excursion is such that grounded rows do not receive enough voltage to change pixel state. Pixels lying in columns connected to the in-phase output 631 are not cleared due to the voltage across them is not sufficient for clearing to occur.

It has been found by the inventors that once a pixellated panel is fully scattered, desired pixels can be partially cleared and will maintain their partially-scattered/partially-cleared state. Several passes using bit-plane data from an original image each giving different partial clearing of differing areas allows the display of a grey-scale image, which will then be held with no power applied.

The different stages of partial clearing can be produced in several ways. One technique is digital drive and this may be relatively easily implemented since the timing and amplitude can be accurately controlled.

Greyscales can be generated either a linear method (e.g. 8 equally weighted bitplanes are used to progressively clear the display to give is, ⅛, ¼, ⅜, ½ etc contrast clearing), or a binary method, where the bitplanes are binary weighted to give additive ½, ¼, ⅛.

Clearing is a cumulative effect dependent on the amplitude and duration of the clearing waveform. Variations in the number of clearing cycles, the amplitude, or the timing of the waveform (see FIG. 5) may be used to control the clearing.

Figure 5:
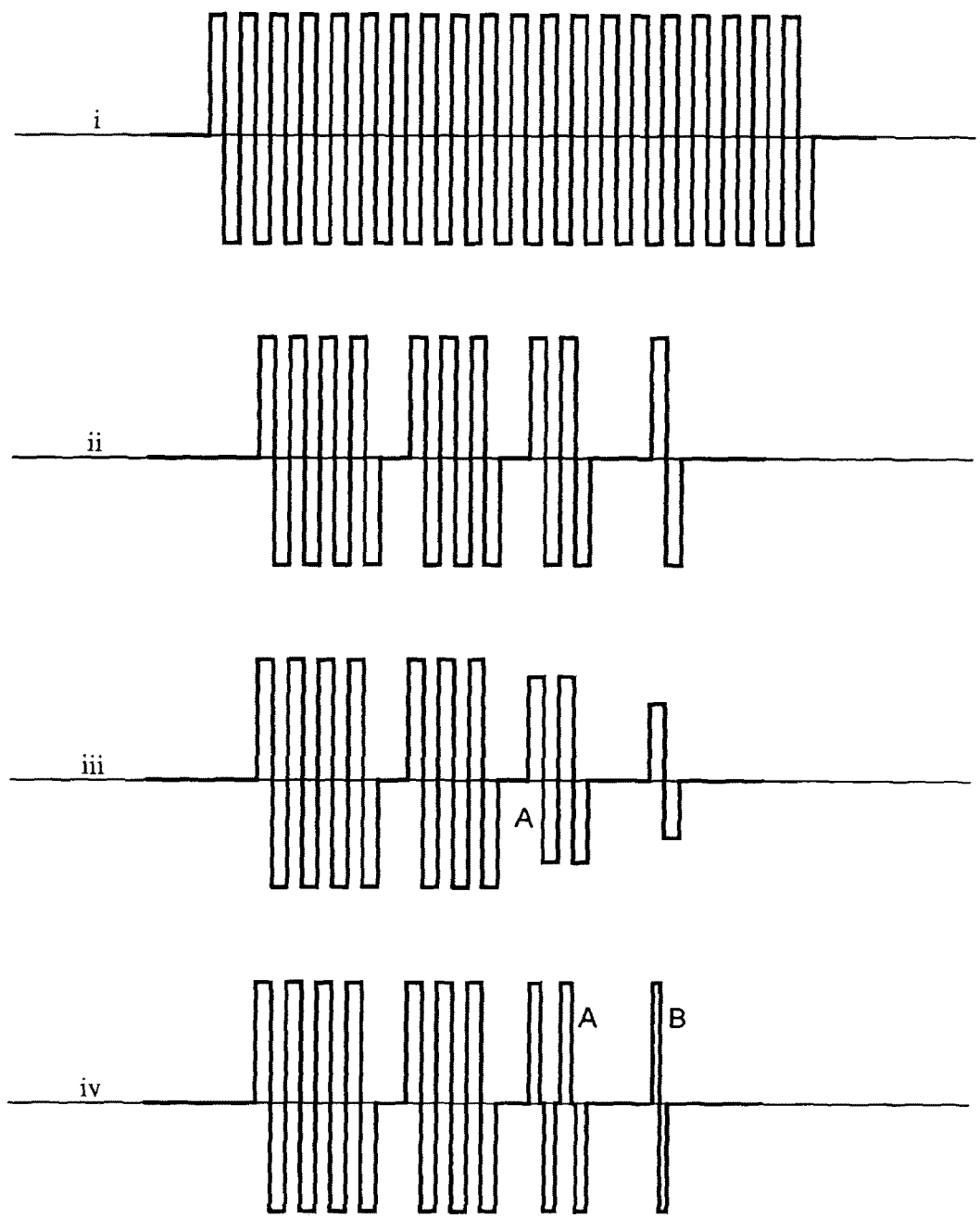
FIG. 5 shows some exemplary waveforms.

FIG. 5 shows examples of drive methods using square wave-type switching to partially clear pixels.

FIG. 5 *i* shows a balanced dc waveform having amplitude approx ±100 volts and a frequency of 2 KHz, ie a normal clearing waveform. The number of cycles shown represents the number of cycles necessary for complete clearing FIG. 5 *ii* shows a sequence of fixed amplitude fixed waveform partial clearing waveforms, where each individual waveform is a dc balanced series of complete cycles. The lefthandmost waveform is four full cycles and is to partially clear the scattering (as required on selected individual pixels of a pixellated display) The next waveform has 3 complete cycles and acts to clear a small amount more, and so on for the next (2 cycles) and the last (a single cycle). Depending on the requirements, a sequence of 4 stages could either give four levels or grey, or could be used to give a binary format of 16 levels.

A problem may occur where it is needed be able to clear only very slightly for a small grey step, where a single cycle is too long.

FIGS. 5 *iii* and 5 *iv* show solutions to this—in FIG. 5 *iii* the initial 4 cycles and the next 3 cycle waveforms are at full amplitude but the 2 cycle waveform and the single cycle have decreases in the waveform amplitude.

In FIG. 5 *iv* the mark/space ratio of the waveform reduces, whereas the amplitude remains the same Combinations of methods of FIG. 5 *iii* and FIG. 5 *iv* can also be used, together with control of the pulse edge rise and fall times.

Similar results can be achieved when modifying other waveshapes—for example sine waves, triangle waves, sawtooth waves and composite waves. However these are less easy to provide.

The clearing effect is strongly non-linear with voltage, with number of cycles etc. Hence relatively large number of clearing cycles may be needed to "half clear" a pixel, whereas a relatively much smaller number may be necessary to clear to "¾ clear". The relationship depends on the precise nature of the smectic A composition, on cell dimensions, temperature etc. An example control circuit to determine the amount of stimulus needed to provide a desired amount of clearing uses look-up table conversions, including cell temperature, to achieve the desired accuracy and reproduceability of results.

Accordingly, referring again to FIG. 4, the drive circuit 600 includes a control unit 660 with an input 661, a first output 662 to the first waveform generator 610 and a second output 663 to the second waveform generator 630. The input to the control unit 660 contains processing circuitry to cause the waveform generators 610,630 to variably clear desired pixels to achieve grey scale operation. To this end the processing circuitry includes look-up tables and has a cell temperature sensor (not shown) to enable the relevant number or form of waves to be provided to achieve the desired effect.

Figure 6:
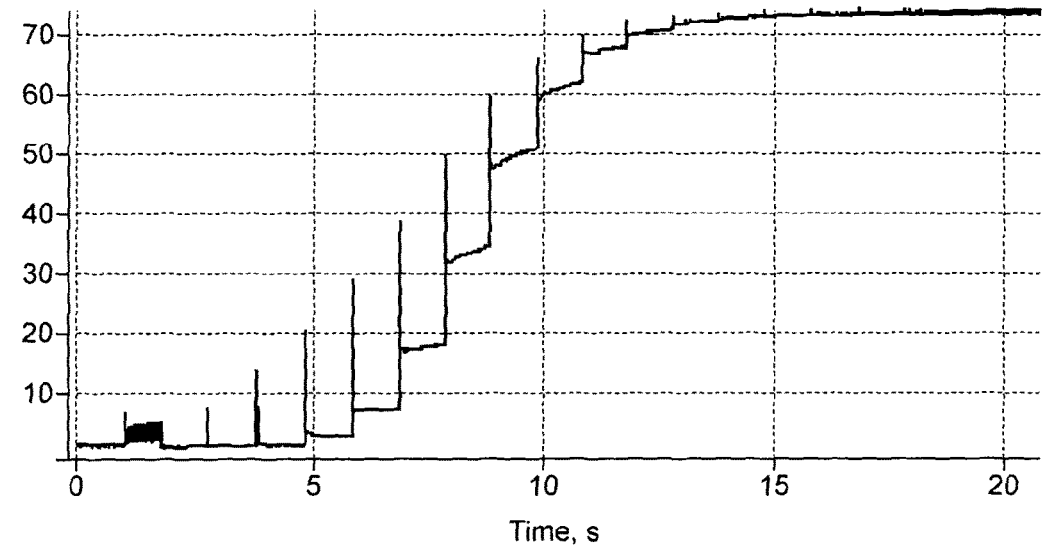
FIG. 6 shows the response of a pixel of a SmA liquid crystal device to a series of partial-clearing pulses.
Figure 6:
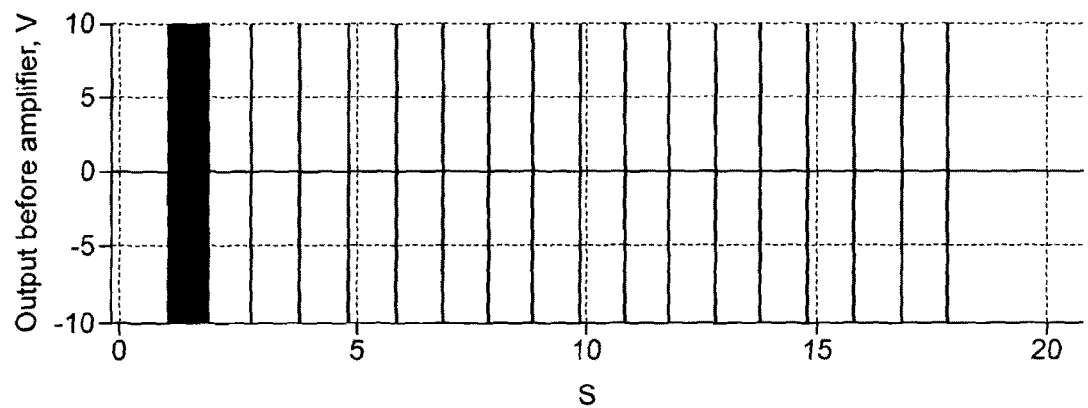

Referring to FIG. 6, the lower graph shows a scattering (second) waveform 601 applied to a pixel. In this case, a total number of 32 cycles would provide full scattering of the pixel of concern. The upper plot shows the response in arbitrary units, with zero being fully scattered (i.e. dark) and 75 being fully clear (i.e. transparent), and thus shows the resultant response 604 by the LC composition. The scattering waveform—here a mains frequency waveform is followed by a series of sixteen partial clearing (first) waveforms 602, all of which are the same. Each partial clearing waveform, for this example, has 2 full cycles of the 1 kHz waveform that is applied for clearing purposes, so giving rise to 16 grey levels.

The effect of this stimulus will be seen to be highly varied—so for example the response 605 to the fourth partial clearing waveform 602 has an end result of a relatively small "jump" in clearing by comparison to the response 606 to the sixth waveform 602. A later partial clearing waveform provides a very small response 607.

Moreover the first discussed response 605 has a remarkable overshoot followed by a period of settling. The overshoot results in a temporary high degree of clearing, which drops back to a steady state that is constant.

The second discussed response 606 also has an overshoot, which is however, less pronounced. Following the overshoot, the degree of clearing falls back but then, instead of being constant, rises to a higher level to achieve its steady state.

The third-discussed response 607 starts by overshooting to fully clear then falls to a less degree of clarity before rising virtually to the fully clear state.

These plots are for a constant temperature.

The behaviour does depend to some extent on the nature of the composition used as the tendency to clear depends on the persistence of the scattering state i.e. the harder it is to clear the less the tendency to drift towards the fully cleared state.

To be able to achieve a desired level of "darkness" (scattering) of a particular pixel, it will be seen that a control circuit needs to "know" the amount of response that will result from a given stimulus. This may be achieved by mapping the response against voltage and temperature into a look-up table by empirical experimentation, or by modelling.

The time taken is dependent on both cell thickness and frequency—for example higher cell thickness is likely to take longer to clear/scatter. As the clearing frequency is increased for a particular cell, the necessary voltage may reduce or the clearing time may reduce. As the scatter frequency falls towards dc, the necessary voltage may reduce or the scattering time may fall. The control circuit 660 may be pre-programmed or may have control inputs to take these into account.

The invention is not restricted to the described embodiments but extends to the full scope of the appended claims.

The invention claimed is:

1. A method of operating a liquid crystal device having a liquid crystal composition with smectic-A properties, in which a first waveform is applied to optically clear the device so that it is substantially transparent to visible light and a second waveform is applied to disorder the material of the liquid crystal composition to afford a strongly light-scattering state, wherein the first waveform has a higher frequency than the second waveform and wherein the first waveform and the second waveform are synchronous, and the method comprising applying a modified waveform to partially clear at least a portion of the device from the light-scattering state.

2. A method according to claim 1 wherein the first waveform is a repetitive dc balanced waveform consisting of a quasi-continuous series of cycles, the number of cycles being at least equal to a predetermined number, wherein the predetermined number clears the device, and the step of applying a modified waveform comprises applying a number of cycles of the first waveform fewer than the predetermined number.

3. A method according to claim 1 comprising determining a number of cycles of the first waveform sufficient to clear the device and applying a fewer number of cycles, as said modified waveform, to partially clear the device.

4. A method according to claim 1 wherein the first waveform is dc balanced and has constant amplitude.

5. A method according to claim 4, wherein said step of applying a modified waveform comprises applying one or more cycles of a waveform having the frequency of the first waveform and an amplitude less than the amplitude of the first waveform.

6. A method according to claim 5, comprising varying the amplitude of the modified waveform.

7. A method according to claim 1, wherein the first waveform has a predetermined pulse width, and the step of applying a modified waveform comprises at least one cycle having the frequency of the first waveform and having a pulse width different to the predetermined pulse width.

8. A liquid crystal device having a liquid crystal composition with smectic-A properties, in which a first waveform is applied to optically clear the device so that it is substantially transparent to visible light and a second waveform is applied to disorder the material of the liquid crystal composition to afford a strongly light-scattering state, wherein the first waveform has a higher frequency than the second waveform and wherein the first waveform and the second waveform are synchronous, the device further comprising a control circuit for applying a modified waveform to partially clear at least one portion of the device from the light-scattering state.

9. A device according to claim 8 wherein the control circuit is configured to respond to a control input for selecting a desired degree of clearing of the at least one portion of the device.

10. A device according to claim 8, wherein the control circuit is configured to take into account the temperature of the liquid crystal composition.

11. A device according to claim 9, wherein the control circuit is configured to take into account the temperature of the liquid crystal composition.

* * * * *